73-634 SR

OR 3,670,562

Muto et al.

[15] 3,670,562

[45] June 20, 1972

[54] HOLDING AND FOLLOW-UP MECHANISM FOR ULTRASONIC FLAW DETECTOR

[72] Inventors: Iwao Muto; Yutaka Matsumura; Katsuyuki Nishifuji; Kenji Matsuura, all of Kawasaki, Japan

[73] Assignee: Nippon Kokan Kabushiki Kaisha

[22] Filed: Sept. 24, 1970

[21] Appl. No.: 75,183

[30] Foreign Application Priority Data

Sept. 29, 1969 Japan....................................44/77085

[52] U.S. Cl. ..........................................73/71.5, 73/67.8 R

[51] Int. Cl. ..........................................G01n 29/04

[58] Field of Search ..................73/67.8 R, 67.8 S, 67.9, 71.5

[56] References Cited

UNITED STATES PATENTS 2,940,305 6/1960 Williams et al. ......................73/67.8 S

FOREIGN PATENTS OR APPLICATIONS 1,358,489 3/1963 France....................................73/71.5

*Primary Examiner*—Richard C. Queisser
*Assistant Examiner*—Arthur E. Korkosz
*Attorney*—Flynn & Frishauf

[57] ABSTRACT

An ultrasonic flaw detector element is mounted on a shoe which is connected to a holding arm by a four linked mechanism. The four linked mechanism consists of two pairs of substantially parallel links spaced laterally on the shoe so that the shoe may be moved into a material engaging position and away while its contact surface remains parallel to the surface of the material to be tested. One of the links forms one arm of a bell crank, the other arm of which is connected to the piston of a double acting cylinder so that movement of the piston raises and lowers the shoe.

9 Claims, 6 Drawing Figures

HOLDING AND FOLLOW-UP MECHANISM FOR ULTRASONIC FLAW DETECTOR

BACKGROUND OF THE INVENTION

The invention relates to a continuous ultrasonic flaw detector, and in particular to a holding and follow-up mechanism for an ultrasonic flaw detector element.

In a high speed ultrasonic flaw detector it is desirable to have a detector element supporting device or material engaging member with a mechanism which holds or supports the detector element so that it follows the vibration or vertical movements of the material to be tested. If the detector element does not follow the vertical movements of the material to be tested accurately and rapidly, the flaw detector will not operate satisfactorily and erroneous detection may result.

It is also desirable to have good acoustic coupling between the detector element and the material to be tested to avoid errors due to false or quasi echoes.

As the running speed is increased for the material being tested, the vibration or vertical movement of the material may increase and the importance of an efficient holding and follow-up mechanism for the detector element becomes more significant.

For flaw detection in wide strip or plate material it is known to use a so-called multi-channel arrangement which has a plurality of detector elements disposed transversely of the strip or plate material. In such an arrangement, if the holding and follow-up mechanism for each detector element is large, the distance between detector elements will be increased. This will disperse the flaw detection signals and decrease the efficiency of flaw detection. It is therefore desirable to have small holding and follow-up mechanisms for use in multi-channel arrangements.

It is also desirable to be able to readily adjust the holding and follow-up mechanisms so that the outputs of the different detector elements can be made equal for the same condition, and it is desirable to be able to raise the detector elements when they are not required.

Various mechanisms for supporting detector elements in ultrasonic flaw detectors are known. One known mechanism comprises a plurality of detector elements assembled in a heavy and large shoe. A spring is associated with each detector element to permit movement, and the mechanism is such that the movement is at right angles with respect to the direction of movement of the material to be tested (i.e., the movement of the detector element is vertical movement in most instances). Because the direction of movement of the detector elements is at right angles to the direction of movement of the material it is difficult for the elements to follow vertical movements of the material particularly when the material is moving rapidly. Further, the large shoe associated with the detector elements is not suitable for a multi-channel arrangement.

Another known mechanism uses four link members to mount a bracket so that the bracket moves only in a vertical direction. A detector element shoe is mounted to the bracket and an air cylinder is connected between the bracket and the shoe and is arranged to bias or urge the shoe against the surface of the material to be tested. A system of crossed springs is provided to raise the detector element when desired. Because the mechanism is restricted to movement in a purely vertical direction, the shoe and detector element do not follow small and rapid vibrations or vertical movements of the material. Also the system of crossed springs results in a wide elevating mechanism that is not suitable for a multi-channel arrangement. Further, because the bracket is relatively small as compared to the detector element shoe, a considerable strain is placed on the bracket and linkage connected thereto when the material to be tested vibrates rapidly during high speed flaw detection.

Thus, in a holding and follow-up mechanism for an ultrasonic flaw detector element, it is desirable that the mechanism be simple, compact for use in multi-channel arrangements, adapted to raise and lower the detector elements as required, and able to follow accurately the up and down movements or vibrations of the material to be tested.

The main object of the present invention is to provide a holding and follow-up mechanism for an ultrasonic flaw detector that is simple, compact, capable of raising and lowering a detector element and capable of following more efficiently the up and down movements of the material to be tested.

SUMMARY OF THE INVENTION

Briefly stated, in accordance with the invention a holding and follow-up mechanism is mounted to a holding arm and comprises a material engaging member, a detector element mounted on the material engaging member for detecting material flaws, and a four linked mechanism interconnecting the material engaging member and the holding arm. The four linked mechanism comprises two pairs of substantially parallel links spaced laterally on and pivotally connected at one end to the material engaging member and at the other end to the holding arm. At least one link of the four linked mechanism forms one arm of a bell crank with the pivot point of the bell crank being one of the pivotal connections to the holding arm. A double acting cylinder has a piston with a projecting arm and is responsive to differential pressure to extend and retract the projecting arm. Connecting means connects the projecting arm and the remote end of the other arm of the bell crank so that the extension and retraction of the projecting arm moves the material engaging member into and out of a material engaging position. One of the connections between a link and the material engaging member may be a slot and pin connection to provide both pivotal and limited linear movement in a direction at right angles to the direction of movement of the material to be tested. This permits small movement of the material engaging member in response to small vertical movements of the material to be tested. Larger vertical movements may be accommodated by including an elastically yieldable element or means, such as a spring, in the connection means between the bell crank and the projecting arm. The detector element and material engaging member may be moved into and out of a material engaging position by applying the required pressure to the double acting cylinder.

DESCRIPTION OF THE PREFERRED EMBODIMENT

Figure 1:
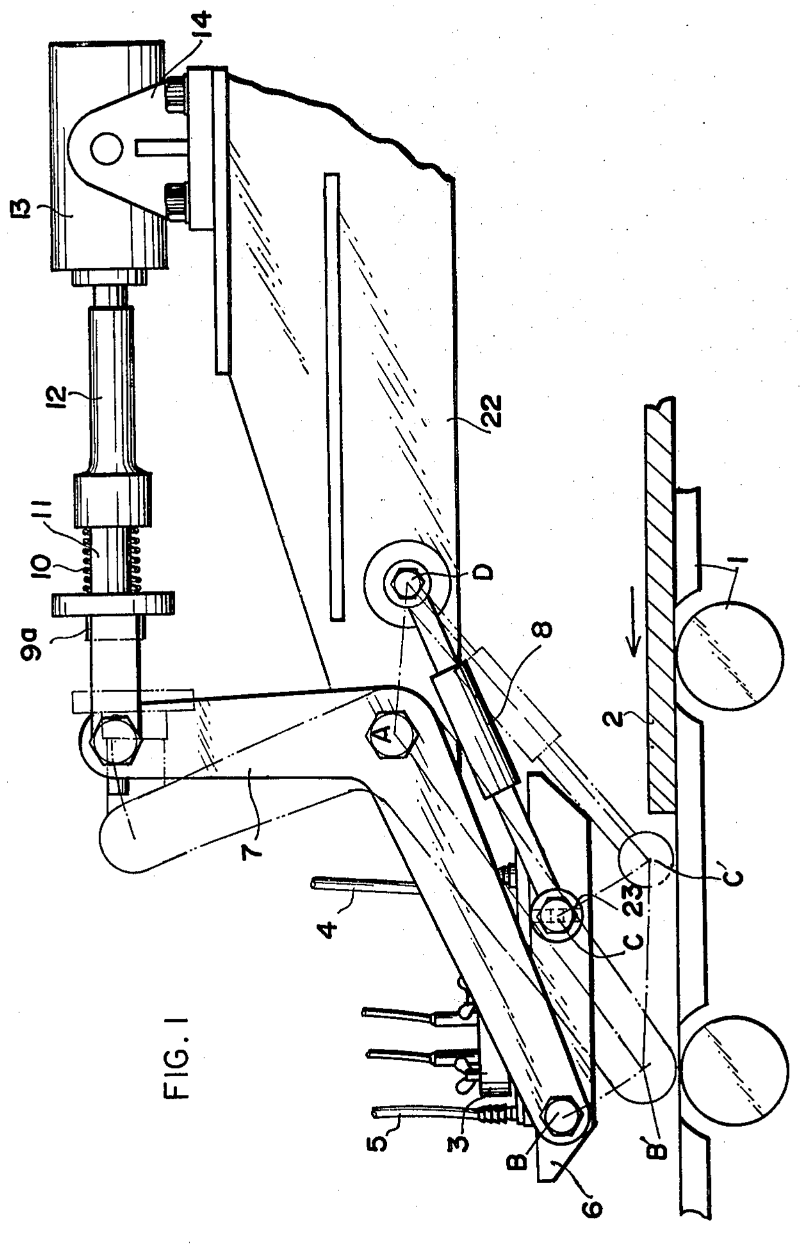
FIG. 1 is a side elevation of one embodiment of the novel holding and follow-up mechanism.
Figure 2:
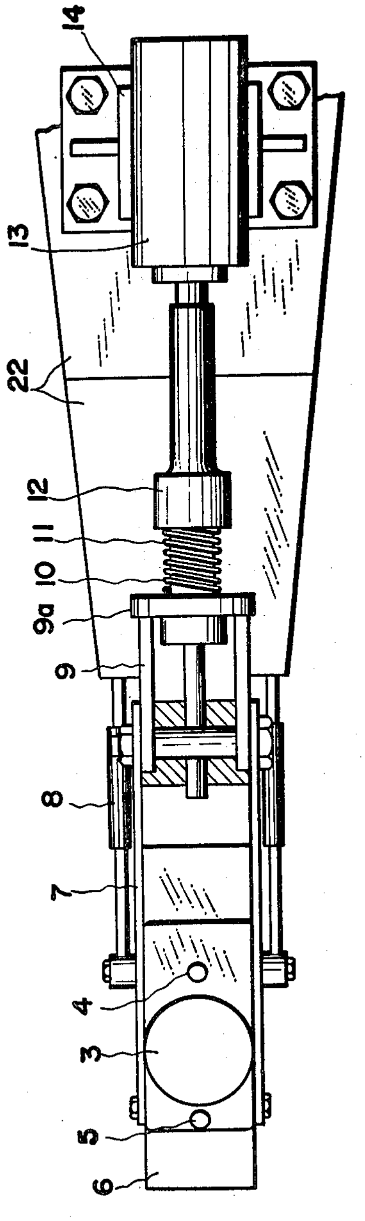
FIG. 2 is a plan view of the embodiment shown in FIG. 1.
Figure 3:
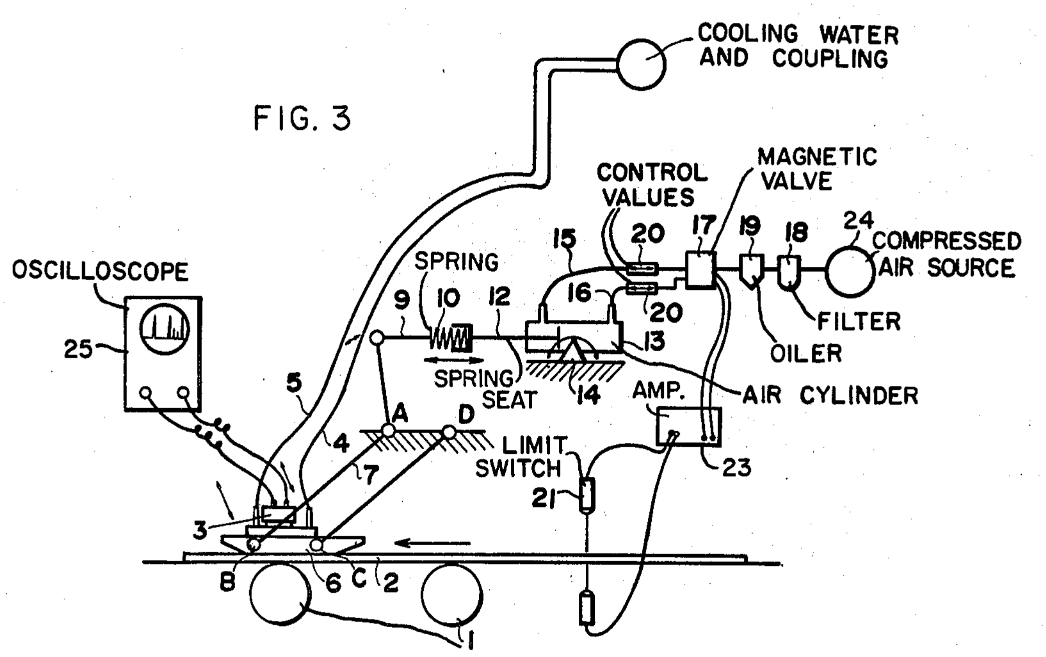
FIG. 3 is a diagrammatic representation of the novel holding and follow-up mechanism.

Referring now to FIGS. 1 and 2, there is shown a holding and follow-up mechanism of this invention utilized for the ultrasonic detection of flaws in a material 2 running on a roller table 1. As shown, a detector element 3 is carried by a material engaging member or shoe 6. Detector element 3 is coupled to an oscilloscope 25 as shown in FIG. 3.

Cooling water is supplied to the shoe 6 through a conduit 4. See also FIG. 3. Water is supplied through conduit 5 to the contact surface between the material 2 and the shoe 6 through openings (not shown) at the bottom of the shoe for the purpose of wetting and of cooling the surface of material 2. A four linked mechanism, diagrammatically shown by A, B, C and D, is provided between the shoe 6 and a holding arm 22 to raise and lower the shoe 6 and to permit it to follow-up variations in contact between the shoe 6 and the material 2. The shoe is maintained substantially parallel with the surface of the material by the four linked mechanism. The four link mechanism is in the form of a parallelogram and is adjusted by means of a turn buckle 8. Pivot C of the four linked mechanism is slidably received in a slot 23 provided in the turn buckle link 8, thus permitting limited tilting movement and enabling the shoe to follow-up small surface irregularities of the material.

The link represented by A B is one arm or part of a bell crank 7. In one mechanism there is at least one and as shown there are a pair of bell cranks 7, one on each side of shoe 6 as seen in the drawings. The lower ends of bell cranks 7 are pivotally connected to shoe 6 as previously described and the upper ends of bell cranks 7 are pivotally connected to rods 9 at one end thereof. The other ends of rods 9 are interconnected by a cross bar 9*a* which is provided with an opening which receives a spring supporting rod 11. The supporting rod 11 fits slidably in the opening in cross bar 9*a* and a coil spring 10 is mounted on spring supporting rod 11. The coil spring 10 is seated at one end thereof in a spring seat 12 and the other end bears against cross bar 9*a* to bias the cross bar 9*a* away from spring seat 12. When the shoe 6 is in a material engaging position, that is pressing against the surface of material 2, the coil spring 10 permits the shoe to move up and down through relatively large distances in response to vertical movements of the material 2.

The detector element, the shoe and the link mechanism are raised and lowered by means of an air cylinder 13 pivotally mounted on pedestals 14 carried by the holding arm 22.

FIG. 3 diagrammatically shows the novel holding and follow-up mechanism. More particularly, a magnetically operated valve 17 or more simply a magnetic valve 17 is operated by a mechanical or an optical limit switch 21 which is operated responsive to the detection of the presence of running material 2. In this example, the limit switch 21 takes the form of a photocell limit switch to detect the presence and absence of running material without contacting the material. Limit switch 21 is coupled to magnetic valve 17 via an amplifier 23. Compressed air supplied by a compressed air source 24 through a filter 18 and an oiler 19 is switched by magnetic valve 17 to one end or the other end of the air cylinder 13 through speed control valves 20 and conduits 15 and 16, respectively. Thus, the air cylinder 13 may have compressed air applied to it to cause the piston thereof to move in either direction to raise or lower the shoe 6.

To avoid damage to a plurality of detector elements of the multi-channel arrangement due to an abnormal running condition of the material 2, the detector elements can be raised to a point well removed from the surface of the material. Thus, by the operation of the air cylinder 13, the shoe 6 is moved to a position shown by solid lines from the operating position or material engaging position shown by phantom lines in FIG. 1. All detector elements may be moved sufficiently away from the surface of the material, thus preventing them from being damaged by an abnormal operating condition.

To bring back detector elements to the normal operating condition, the cylinder 13 is operated in the opposite direction thereby lowering the shoe 6 to the normal position. In this position, the shoe 6 is urged against the surface of the material 2 by a force originating with the cylinder 13.

Figure 4A:
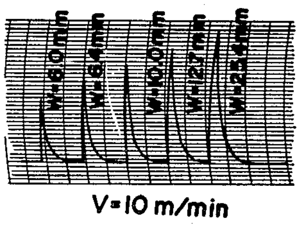
FIG. 4*a* shows recording charts illustrating the tests made with the flaw detection apparatus on test pieces provided with artificial defects with a flaw detection chart speed of 10 m/min.
Figure 4B:
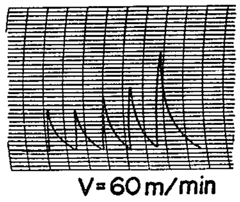
FIG. 4*b*, shows recording charts run at 60 m/min.
Figure 4C:
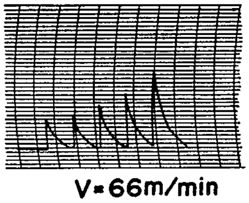
FIG. 4*c*, shows recording charts run at 66 m/min.

FIG. 4 shows a result of flaw detection test carried out with the novel apparatus on samples formed with artificial channel shaped defects. FIGS. 4*a* to 4*c* show flaw detection charts for running speed of 10 m/min., 60 m/min. and 66 m/min., respectively. In FIG. 4, W indicates the width of the channel shaped defects. From this result it can be clearly noted that the defect detection characteristics are similar although the output decreased with the running speed. As shown by the left hand curve in FIG. 4*c*, small defects of 5 mm wide can be satisfactorily detected at a high running speed of 60 m/min. or more. Further, there is no evidence of a false echo which is otherwise caused by incomplete coupling of the ultrasonic wave due to poor follow-up movement of the shoe.

While a shoe coupling system has been shown and described for the purpose of coupling the ultrasonic wave generated by the detector element 3 to the material being tested, it will be clear to one skilled in the art that the shoe may be replaced by a sliding block or a rotary block.

As can be clearly noted from the foregoing description, since a four linked mechanism is directly connected to a shoe or a detecting element supporting member, the shoe can move back and up to follow large variations of the contact caused by severe vibration of the running material. The air cylinder 13 can apply uniform contact pressure to the shoe through the four linked mechanism during its flaw detection operation. The slot and pin connection between one pivot of the four linked mechanism and the shoe permits positive follow-up movement of the shoe to small irregularities of the surface condition of the material. The speed of raising and lowering of the shoe can be controlled by control valves 20 so as to avoid various troubles accompanying high speed flaw detection. Since the width of the elevating mechanism for one channel is small, this construction is suitable for a multi-channel arrangement.

Further, the detector element can be moved far away from the operating or material engaging position for the purpose of repair and inspection and to prevent damage to the detector element due to abnormal operating conditions.

While the invention has been shown and described in terms of a preferred embodiment thereof, many changes and modifications will occur to one skilled in the art within the scope of the invention as defined in the appended claims.

We claim:

1. A holding and follow-up mechanism for an ultrasonic flaw detector comprising, a holding arm for mounting the mechanism, a material engaging member, a detector element mounted on said material engaging member for detecting material flaws, a four linked mechanism comprising two pairs of substantially parallel links spaced laterally on and pivotally connected at one end to said material engaging member and at the other end to said holding arm, at least one link of said four linked mechanism forming one arm of a bell crank with the pivot point of the bell crank being one of the pivotal connections to said holding arm, the other arm of said bell crank extending therefrom, a double acting cylinder having a piston with a projecting arm and being responsive to differential pressure to extend and retract said projecting arm, and connecting means between said projecting arm and the remote end of said other arm of said bell crank for moving said material engaging member into and out of a material engaging position with extension and retraction of said projecting arm.

2. A holding and follow-up mechanism as defined in claim 1 wherein one of said links is pivotally connected to said material engaging member with a pin and slot connection, thereby providing for pivotal movement and limited linear movement of said material engaging member.

3. A holding and follow-up mechanism as defined in claim 2 wherein said one of said links has said slot formed therein, said slot being pivotally engaged with said pin extending from said material engaging member.

4. A holding and follow-up mechanism as defined in claim 1 wherein said connecting means includes an elastically yieldable means to accommodate limited movement of said material engaging member.

5. A holding and follow-up mechanism as defined in claim 1 which further comprises a switch responsive to the presence of a material to be tested to operate a valve for controlling the pressure applied to said double acting cylinder.

6. A holding and follow-up mechanism as defined in claim 5 wherein said switch responsive to the presence of a material to be tested comprises a photocell switch to detect the presence or absence of material to be tested.

7. A holding and follow-up mechanism for an ultrasonic flaw detector comprising, a holding arm for mounting the mechanism, a supporting shoe for engaging a material to be tested, a detector element mounted on said shoe for detecting flaws in the material to be tested, a pair of bell cranks each having a first and second arm and a pivot point at the junction of said first and second arms, a pair of link members, the remote end of said first arm of each bell crank being pivotally connected with said shoe on opposite sides thereof and said pivot point being pivotally connected to said holding arm, said link members being pivotally connected at one end to opposite sides of said shoe spaced from said remote end of said first arm and being pivotally connected at the other end to said holding arm, said first arm and said link member on each side being substantially parallel to one another, a double acting cylinder having a piston with a projecting arm and being responsive to differential air pressure to extend and retract said projecting arm, means connecting said projecting arm to the remote ends of said second arms of said bell cranks for moving said shoe into and out of engagement with said material to be tested in response to extension and retraction of said projecting arm.

8. A holding and follow-up mechanism as defined in claim 7 in which said means connecting said projecting arm to the remote ends of said second arms includes a spring permitting movement of said bell cranks in response to movements of said shoe as the material to be tested passes beneath and in contact with said shoe.

9. A holding and follow-up mechanism as defined in claim 7 in which the pivotal connection of one of said link members to said shoe is a pin and slot connection providing pivotal movement and limited linear movement of the shoe in the region of the connection in a direction at right angles to the movement of the material to be tested.

* * * * *